United States Patent [19]
Hosaka et al.

[11] Patent Number: 5,162,653
[45] Date of Patent: Nov. 10, 1992

[54] SCANNING TUNNELING MICROSCOPE AND SURFACE TOPOGRAPHIC OBSERVATION METHOD

[75] Inventors: Sumio Hosaka, Nishitama; Shigeyuki Hosoki, Hachioji; Keiji Takata, Tokorozawa; Tsuyoshi Hasegawa, Kokubunji, all of Japan

[73] Assignee: Hitachi, Ltd., Tokyo, Japan

[21] Appl. No.: 796,813

[22] Filed: Nov. 25, 1991

Related U.S. Application Data

[63] Continuation of Ser. No. 366,431, Jun. 15, 1989.

[30] Foreign Application Priority Data

Jun. 2, 1988 [JP] Japan .................... 63-154696

[51] Int. Cl.$^5$ .................................... H01J 37/26
[52] U.S. Cl. ............................. 250/306; 250/307
[58] Field of Search ........................ 250/306, 307

[56] References Cited

U.S. PATENT DOCUMENTS

| | | | |
|---|---|---|---|
| 4,841,148 | 6/1989 | Lyding | 250/306 |
| 4,870,352 | 9/1989 | Koechner | 250/307 |
| 4,894,538 | 1/1990 | Iwatsuki et al. | 250/306 |
| 4,902,892 | 2/1990 | Okayama et al. | 250/306 |
| 5,047,637 | 9/1991 | Toda | 250/306 |
| 5,059,793 | 10/1991 | Miyamoto et al. | 250/306 |

*Primary Examiner*—Jack I. Berman
*Assistant Examiner*—Kiet T. Nguyen
*Attorney, Agent, or Firm*—Antonelli, Terry, Stout & Kraus

[57] ABSTRACT

In a surface topographic observation method using a scanning tunneling microscope, a probe is moved away from the surface of a sample and is moved on a plane to successively move it to points of measurement on the surface of the sample in order to obtain texture information of the sample. That is, the probe is moved on a plane completely preventing the probe tip from colliding with the surface of the sample and enabling the probe to effect scanning at high speeds.

30 Claims, 6 Drawing Sheets

(a) TUNNEL CURRENT It (b) INTEGRATOR CONTROL SIGNAL Se (c) INTEGRATOR OUTPUT SIGNAL S'a (d) X-SCANNING SIGNAL Sx

SCANNING TUNNELING MICROSCOPE AND SURFACE TOPOGRAPHIC OBSERVATION METHOD

This application is a continuation of application Ser. No. 366,431, filed Jun. 15, 1989.

BACKGROUND OF THE INVENTION

The present invention relates to improvements in the technology for observing the surface shape of a sample by utilizing a tunnel current or a field emission current that generates when the probe tip is brought close to the surface of a sample and when a voltage is applied across them. More specifically, the invention relates to a scanning tunneling microscope which is so improved as to be adapted to obtaining topographic information on the surface of the sample within short periods of time by scanning a wide scanning field on the surface of the sample at high speeds using the probe tip or to obtaining topographic information on the surface of the sample which consists of a high resistance material, and further relates to a new surface topographic observation method.

A scanning tunneling microscope according to the prior art has been discussed in, for example, Physical Review Letters, 49, 1982, pp. 57-61.

According to the scanning tunneling microscope of the above prior art, attention has not been given to measuring the surface shapes when the scanning field (surface region to be observed) is wide on the surface of the sample or when the electric resistance is very great on the surface of the sample. In the former case, i.e., when a wide scanning field is to be measured, a very extended period of time is consumed for the scanning and in the latter case, i.e., when the surface having a high resistance is to be measured, the electronic current does not flow steadily making it difficult to take measurement maintaining reliability. In the former case, in particular, atoms react with each other between the probe tip and the surface of the sample. Therefore, atomic size resolution is required for the scan control system of the scanning tunneling microscope. In the prior art, however, since the scanning control system exhibits low response characteristics, the scanning time must be increased with the increase in the scanning field. When a square surface to be observed having a side of about 2.5 $\mu$m is scanning with a raster scan line number of 256 according to the prior art, the scanning time (for measurement) of about 90 minutes is required. When a wider surface is to be observed, furthermore, the scan lines are lengthened and the time required for measurement increases in proportion to the length of the scan lines.

SUMMARY OF THE INVENTION

The object of the present invention therefore is to eliminate the above-mentioned problems inherent in the prior art, and the principal object is to provide a scanning tunneling microscope which is capable of greatly reducing the time required for the measurement even when a very wide surface is to be observed as well as to provide a surface topographic observation method using the scanning tunneling microscope.

Another object of the present invention is to provide a scanning tunneling microscope which is capable of taking measurement maintaining reliability even when the surface of the sample has a high resistance as well as to provide a sample surface observation method using the scanning tunneling microscope.

The above-mentioned objects are achieved in a way as described below. That is, in the case of a wide surface region to be observed, the atomic size resolution is not an essential requirement, but the resolution of the order cf nanometers or of the order of microns is sufficient. Therefore, the surface region to be observed should be divided into pixels (partial regions) of a desired number and the sample surface information be obtained for the desired pixels only. For this purpose, the probe tip is discretely moved to the positions corresponding to the pixels in order to obtain surface information of the sample at these positions. Furthermore, the probe tip is spatially moved in a direction in parallel with the surface of the sample being sufficiently separated away from the sample so that it will not collide with the surface of the sample. This makes it possible to shorten the time required for the measurement as well as to prevent the probe tip from being damaged.

Depending upon the samples, furthermore, the electric charge may be permitted to move in small amounts only due to high resistance on the surface. In such a case, a system is employed which detects a very small tunnel current that flows instantaneously when the probe tip has approached the surface of the sample, stops the probe tip from further approaching the surface of the sample, and readily brings the probe tip away from the surface of the sample in order to obtain texture information of the sample surface at that moment. This makes it possible to measure the surface of the sample that has a high resistance. According to such a characteristic constitution of the present invention, first, the probe tip effects the scanning discretely when the region to be scanned is wide, making it possible to obtain topographic information on the sample surface within short periods of time. Furthermore, the scanning is effected while keeping the probe tip away from the sample surface. Therefore, the probe tip does not collide with the sample surface and is not damaged. Even in the case of a high resistance sample, the sample surface topographic information is obtained though the electric charge is permitted to move in small amounts only. Even when a wide surface region is to be observed, the measurement can be taken in short periods of time and even when the sample surface has a high resistance, and the surface shape can be measured without erroneous operation.

BRIEF DESCRIPTION OF THE DRAWINGS

FIGS. 2(a-c) are time charts for explaining the fundamental operation of FIG. 1;

FIGS. 5(a-g) are time charts for explaining the operation of the probe tip position controller of FIG. 4;

FIGS. 6(a-g) are time charts for explaining the operation of the device of when the present invention is applied to measuring the distribution of voltage-current characteristics;

FIGS. 7(a-c) time charts for explaining the operation of the device of when the present invention is applied to measuring a current image;

FIGS. 9(a-d) are time charts for explaining the operation of the probe tip controller of FIG. 8.

DESCRIPTION OF THE PREFERRED EMBODIMENTS

Embodiments of the present invention will now be described in conjunction with FIGS. 1 to 9.

Figure 1:
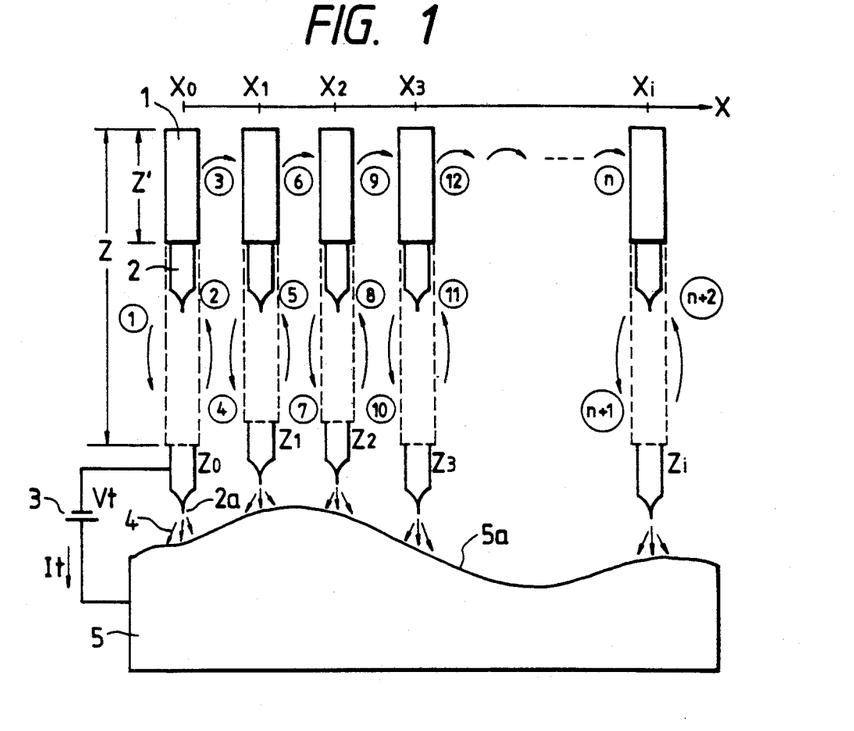
FIG. 1 is a schematic diagram which illustrates the fundamental operation of a scanning tunneling microscope according to the present invention.
Figure 2:
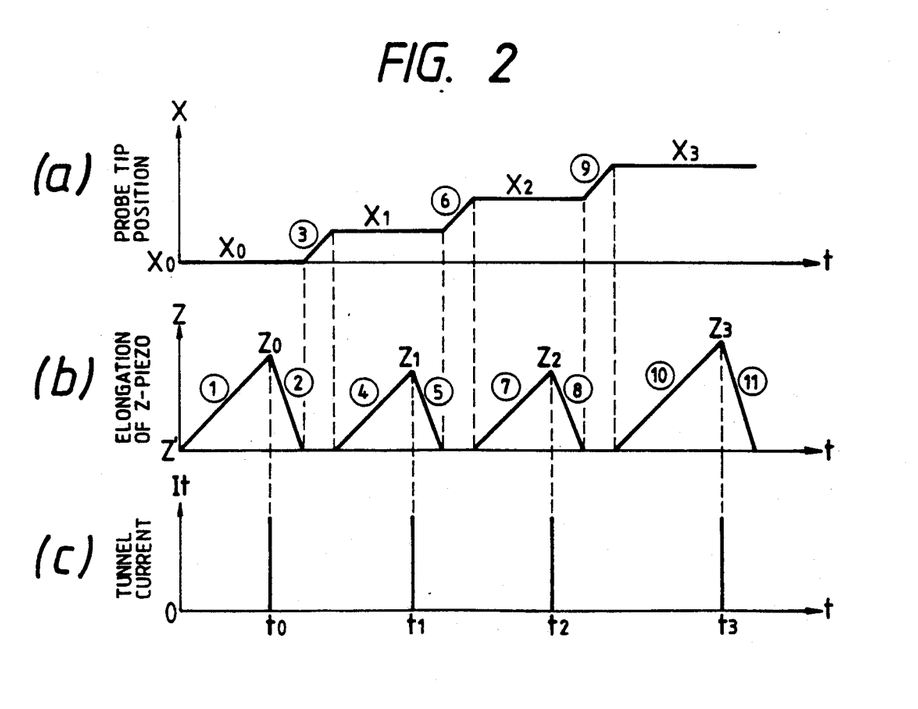

FIGS. 1 and 2 are a schematic diagram illustrating the fundamental operation of a scanning tunneling microscope according to the present invention and a time chart for explaining the operation. FIG. 1 shows the motion of 2a probe tip 2 with respect to the surface 5a of a conductive material 5 such as a metal, and represents the case where texture information (position information in the direction of Z-axis) of the surface 5a of the sample is to be obtained at measuring points of a number of $(i+1)$ that are discretely set in the X-direction on the surface of the sample. Referring to FIGS. 1 and 2, a Z-axis piezo device 1 is, first, contracted as denoted by $Z'$ at a position $X_0$ on the X-axis, and a tip 2a of probe 2 is sufficiently separated away from the sample surface 5a. When the measurement is started, the Z-axis piezo device 1 extends in the direction of Z-axis with the increase in the voltage applied from a control circuit that is not shown, and the tip 2a of probe 2 gradually approaches the sample surface 5a (step 1). As the probe tip 2a further approaches the sample surface 5a and enters into a tunneling effect region, tunneling electrons 4 are emitted from the probe tip 2a due to a voltage Vt applied from a tunnel voltage source 3 and a tunnel current It flows. At this moment, the tunnel current It is detected and the displacement of the probe tip 2a is stored, i.e., the elongation $Z_0$ of the Z-axis piezo device 1 is stored and, at the same time, the voltage applied to the piezo device 1 is returned to 0 V. The Z-axis piezo device 1 then contracts and the probe returns to the initial position as shown in a step 2. When this operation is completed, the probe 2 quickly moves to a next position $X_1$ (step 3). As the probe 2 is moved to the position $X_1$, the Z-axis piezo device 1 extends in a step 4 in the same manner as in the aforementioned step 1. The tunnel current It is detected just when the elongation $Z_1$ is reached. The elongation $Z_1$ is then stored, and the probe 2 returns to the initial position in a step 5 just in the same manner as in the aforementioned step 2. In a step 6, the probe 2 moves to a next position $X_2$ in the same manner as in the aforementioned step 3. The above-mentioned probe operation is repeated to measure the shape of the surface of the sample. The data to be measured consist of storing elongation Zi of the Z-axis piezo device for the position Xi of the probe 2 on the X-axis at a moment when a tunnel current is detected each time. FIG. 1 exemplifies the case where the one-dimensional scanning is effected in the direction of X-axis. It is, however, allowable to obtain three-dimensional topographic information of the sample surface 5a based on the two-dimensional scanning by moving the probe 2 in the direction of Y-axis, too.

Figure 3:
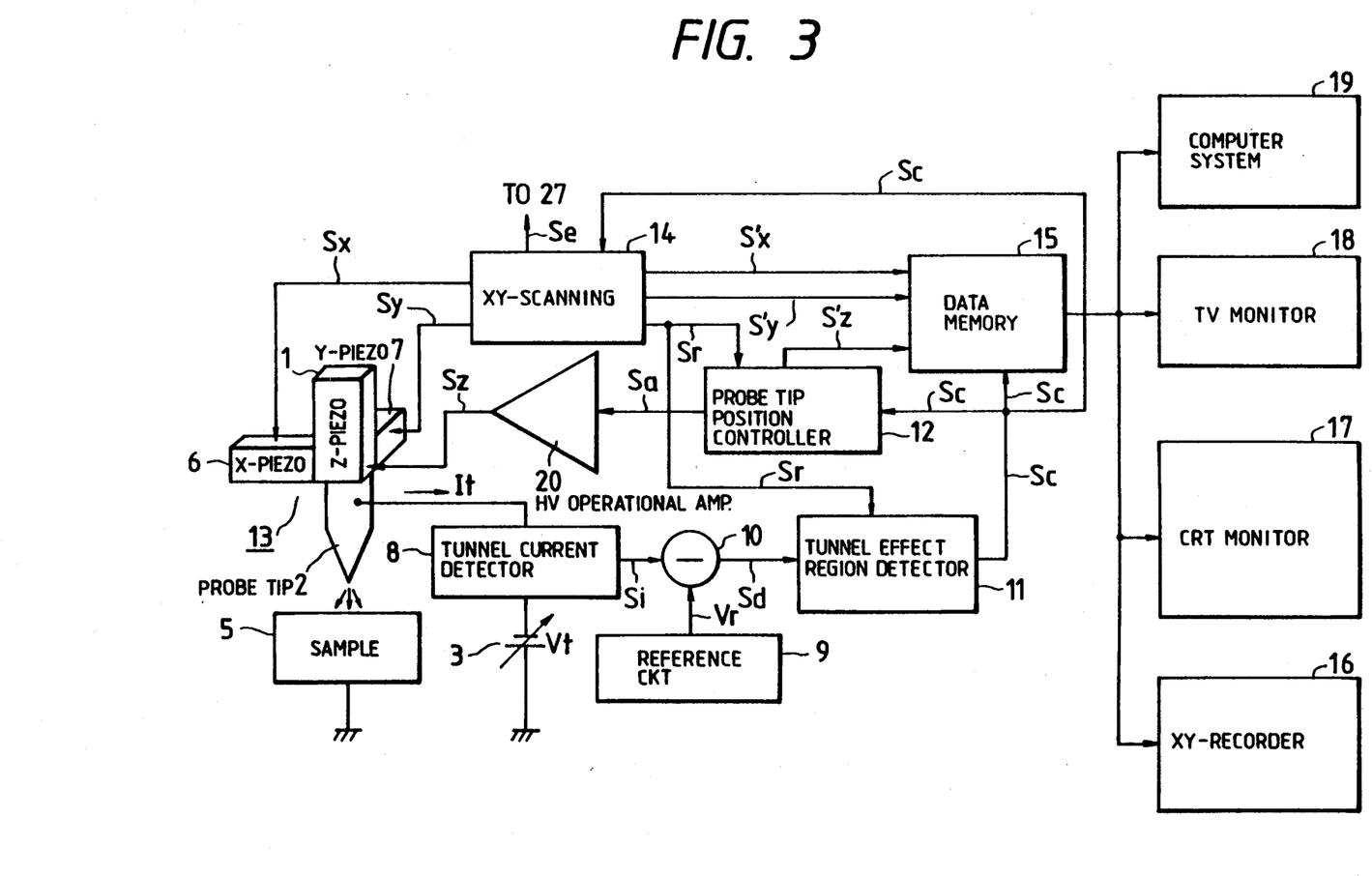
FIG. 3 is a block diagram showing concrete constitution of a scanning tunneling microscope according to a first embodiment of the present invention.
Figure 4:
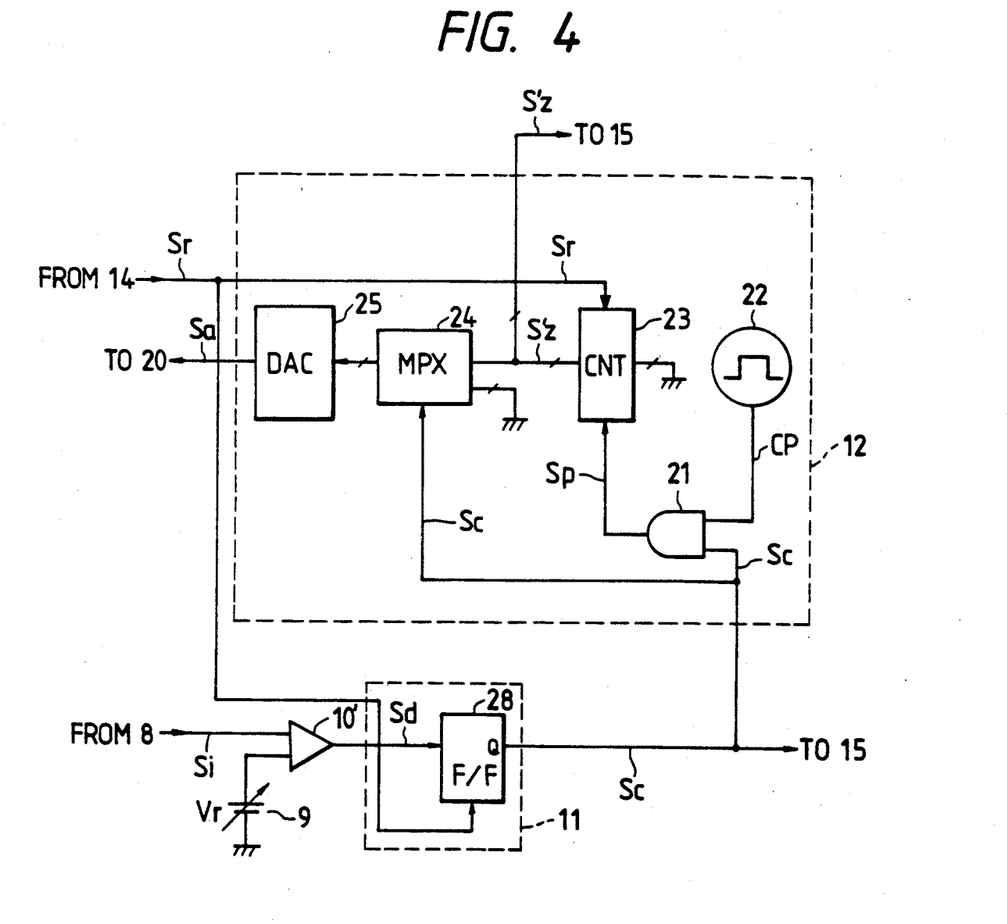
FIG. 4 is a block diagram showing concrete constitution of a probe tip position controller in FIG. 3.

FIG. 3 shows a concrete constitution of when the present invention is adapted to a scanning tunneling microscope, wherein a tripod scanner 13 for finely and three-dimensionally actuating the probe 2 consists of a Z-axis piezo device 1, an X-axis piezo device 6 and a Y-axis piezo device 7. The probe position control in the Z-direction is constituted by a tunnel voltage source 3, a reference circuit 9, a tunnel current detector 8, a subtractor 10, a tunneling effect region detector 11, a probe position controller 12, and a high-voltage operational amplifier 20. Further, the controller is constituted by an XY-scanning unit 14 for scanning the probe 2 in the X- and Y-directions, a data memory circuit 15, a display system and a data processing system. The display system is constituted by a TV monitor 18, a CRT monitor 17 and an XY-recorder 16, and the data processing system is constituted by a computer system 19. A great difference of the invention from the prior art exists in a portion for controlling the probe 2 in the Z-direction, and the principal features of the present invention resides in the functions of the tunneling effect region detector 11 and of the probe tip position controller 12. FIG. 4 shows a concrete constitution of that portion and FIG. 5 is a time chart for explaining the operation.

The circuit of FIG. 4 is constituted by a reference source 9, a comparator 10', a tunneling effect region detector 11 which consists of a flip-flop 28, and a probe tip position control system 12 which consists of a pulse generator 22, a gate circuit 21, a counter 23, a multiplexer 24, and a digital-to-analog converter (DAC) 25. In the concrete embodiment, a system is employed in which the probe 2 is brought close to the sample surface 5a at nearly a constant speed based on digital signals $Sz'$.

Figure 5:
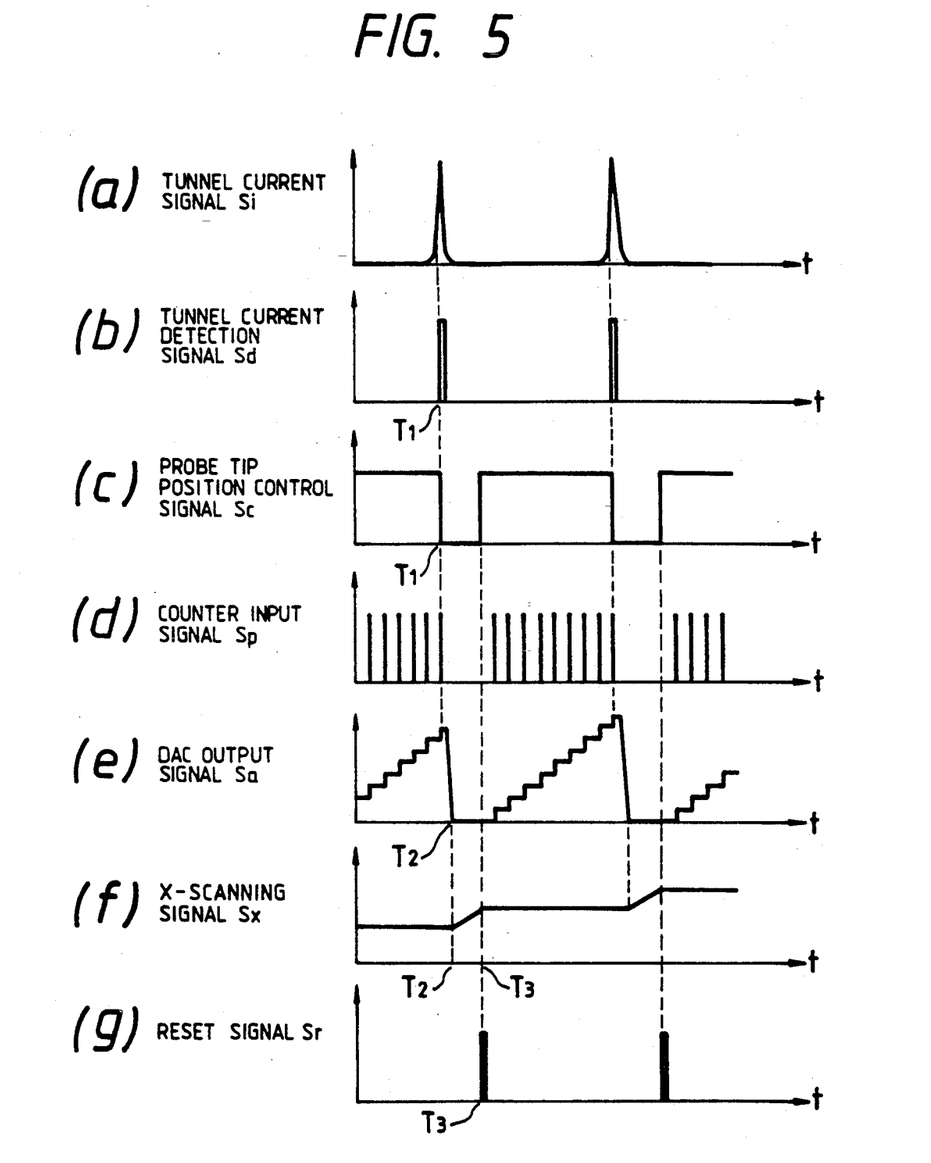

FIG. 5 shows output signals and their timings at each of the portions of FIG. 4. A clock pulse CP produced from the pulse generator 22 passes through the gate circuit 21 and is input as an input pulse signal Sp to the counter 23. That is, when the probe 2 approaches the sample 5, the gate circuit 21 is opened and permits clock pulses to be sent as pulse signals Sp to the counter 23. The content of the counter 23 is input as a digital signal $Sz'$ to the DAC 25 via the multiplexer 24, an analog output signal Sa of the DAC is input to the high-voltage operational amplifier 20, and an output signal Sz of the amplifier 20 is applied to the Z-axis piezo device 1 such that the probe 2 is brought close to the sample surface 5a. As the tip 2a of probe 2 enters into a region where a tunnel current flows, then the tunnel current It flows abruptly, the tunnel current detector 8 produces a tunnel current signal Si, the comparator 10' produces a tunnel current detection signal Sd which is input to the flip-flop circuit 28. The flip-flop circuit 28 than produces a probe tip position control signal Sc of a low level. Therefore, the gate circuit 21 is closed to cut off the supply of pulses Sp to the counter 23, and the output signal Sa of the DAC is held at a value of that moment. At this moment, however, the multiplexer 24 in the preceding stage selects all "0", so that the output signal Sa of the DAC 25 is suddenly returned to 0 V immediately thereafter. Therefore, the Z-axis piezo device 1 contracts and the probe 2 is separated away from the sample 5. At the same time, the content $Sz'$ in the counter 23 is written into the data memory 15. When the probe 2 has completely moved back to the initial position to avoid collision, the XY-scanning unit 14 generates a scanning signal Sx (or Sy) in the X-direction (or in the Y-direction), and the probe discretely moves to a next point of measurement. After this movement is completed, the XY-scanning unit 14 generates a reset signal Sr, such that the flip-flop 28 produces an output signal Sc of the high level and that the content of the counter 23 is returned back to "0". Therefore, input pulses Sp are input again to the counter 23 and its output value Sz' increases starting from "0" gradually and stepwisely. Further, the multiplexer 24 selects the output Sz' of the counter 23 such that the output voltage of the DAC 25 increases starting from 0 V gradually and stepwisely; i.e., the Z-axis piezo device 1 is extended and the probe 2 is brought close to the sample 5. As described above, the fundamental operation of FIG. 1 is realized.

Figure 6:
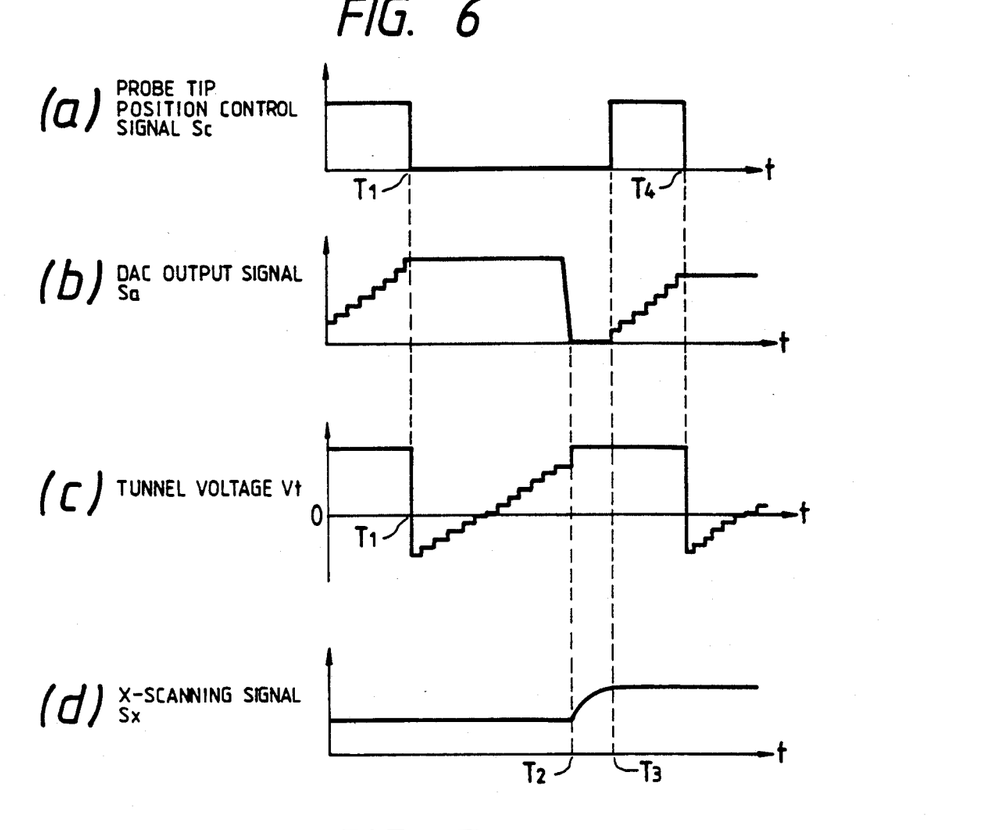

FIG. 6 is a time chart of the case where the probe 2 is held in the tunneling effect region in order to also measure the voltage-current characteristics of tunnel effect. Referring to FIG. 6, the tunnel current is detected at a time $T_1$ as shown in the diagram (a) and the output Sa of the DAC 25 is maintained constant as shown in the diagram (b). The tunnel voltage Vt is then scanned as shown in the diagram (c) and the tunnel current It at every moment is stored being corresponded to the tunnel voltage Vt. Thereafter, the probe 2 is moved away from the sample surface as shown in the diagram (b) and is then moved at a time $T_2$ in the diagram (d) to bring it to a next point of measurement. After positioned at a time $T_3$, the probe 2 is brought close to the sample as shown in the diagram (b). The probe 2 that the arrived at the tunneling effect region at a time $T_4$ is held at that position in the Z-direction, and the aforementioned operation is repeated. Thus, there are obtained the surface shape of the sample and the tunnel voltage vs. tunnel current characteristics on the surface.

Figure 7:
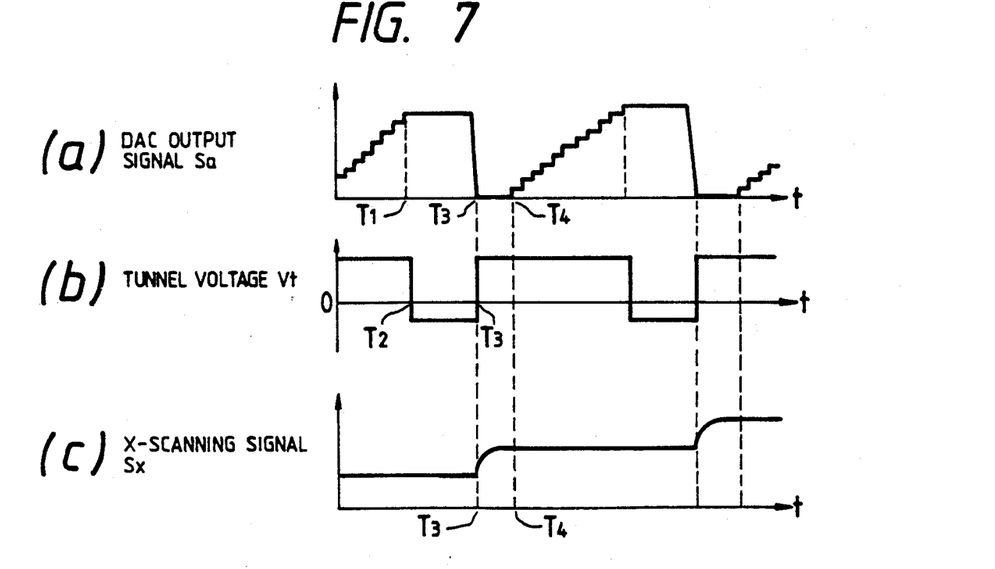

FIG. 7 is a time chart of the case when a sample surface shape and a tunnel current image are to be obtained. The probe 2 is held in the tunnel region at a time $T_1$ as shown in the diagram (a) and, then, the tunnel voltage Vt is set to a desired value at a time $T_2$ as shown in the diagram (b) and a tunnel current It at that moment is stored. Thereafter, the output voltage Sa of DAC 25 is returned to 0 V at a time $T_3$, the tunnel voltage Vt is returned to the initial value, the probe 2 is moved at high speeds to a next point of measurement in the X-direction (or Y-direction) and, then, the same operation is repeated. Texture positions and tunnel currents on the sample surface are thus measured. This operation is carried out for the whole scanning regions on the sample surface in order to obtain a three-dimensional shape and a tunnel current image on the sample surface.

Figure 8:
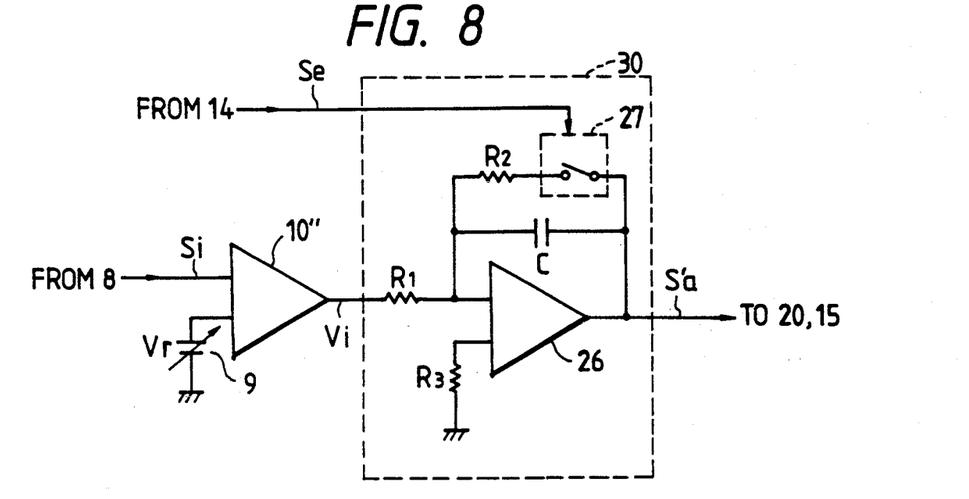
FIG. 8 is a block diagram showing another concrete constitution of the probe tip position controller in FIG. 3.
Figure 9:
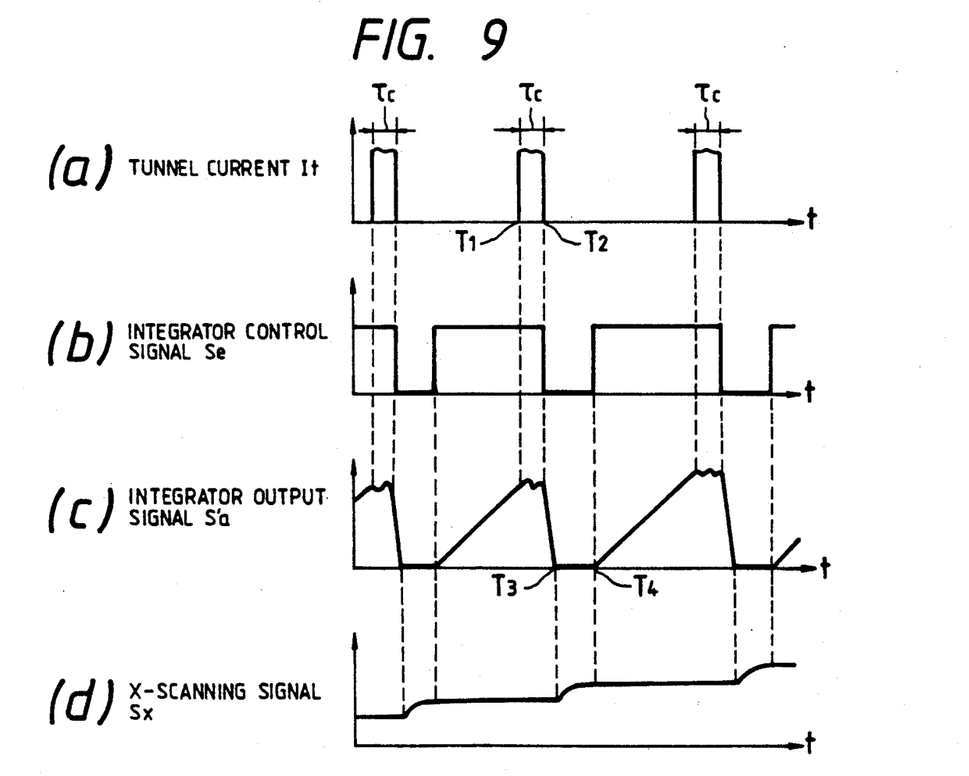

As described above, the probe 2 is brought close to the sample 5 at a predetermined speed using digital signals. The probe, however, can also be moved using analog signals. FIGS. 8 and 9 are a diagram of a probe tip position control circuit that operates on analog signals and a time chart thereof. In the probe tip position control circuit, the output Vi of a comparator 10" is input to an integrator 30 and its output signal Sa' is input to the high-voltage operational amplifier 20, in order to bring the probe 2 close to the sample 5 at a constant speed. When the tunnel current It is flowing according to this circuit, the position of the Z-axis piezo device 1 in the Z-direction is so controlled that the output Vi of the comparator 10" becomes 0 V and that the tunnel current It becomes constant. That is, when the probe 2 is away from the sample 5, there flows no tunnel current It. Therefore, the comparator 10" produces an output Vi of a predetermined value, and the signal voltage Sa' produced by the integration 30 increases maintaining a predetermined gradient as shown in FIG. 9(c). At this moment, an integrator control signal Se has the high level, and a relay switch 27 that controls the circuit condition of the integrator 30 is opened. Therefore, the integrator 30 carries out the integrating operation. Then, as the probe 2 enters into the tunneling effect region (time $T_1$), there flows the tunnel current It and the position of the probe 2 in the Z-direction is so controlled that the tunnel current It becomes constant (FIGS. 9(a) and 9(c)). At a time $T_2$ after a period of time $\tau_c$ has passed from when the tunnel current It has flown, the voltage of a signal Sa' corresponding to the elongation of the Z-axis piezo device 1 is stored in the data memory 15 such that the integrator control signal Se assumes the low level. The relay switch 27 is then closed to discharge the electric charge stored in an integrating capacitor C that is connected across the input terminal and the output terminal of the amplifier 26. As shown in FIG. 9(c), therefore, the output signal Sa' of the integrator 30 returns to 0 V, and the Z-axis piezo device 1 is completely contracted (time $T_3$). Thereafter, the probe 2 is discretely moved to a next point of measurement in the X-direction (or Y-direction), and the operation is repeated again from the time $T_4$ after the movement has been completed to measure the sample surface topography over a desired scanning surface region. In this case, the integrator control signal Se and the probe scanning signal Sx are produced from the XY-scanning unit 14 of FIG. 3. Furthermore, if the time $\tau_c$ is shortened in FIG. 9(a), the operation becomes nearly the same as that of FIG. 5 which is the system that does not use servo mechanism for making the tunnel current constant. It is further allowable to employ a sample holding circuit (not shown) after the integrator 30 in FIG. 8, such that the probe 2 is held in the tunneling effect region. In such a case, it is allowed to obtain Vt-It characteristics of tunnel current as well as tunnel current image that were explained in conjunction with FIGS. 6 and 7.

The aforementioned embodiments have dealt with the cases where the tunnel current was detected. The present invention can further be adapted to the cases where physical informations such as interatomic force (pressure), temperature, light, electrostatic capacity and electric resistance are to be detected, just like the aforementioned embodiments. In the aforementioned embodiments, furthermore, a mechanism was employed for moving the probe in a three-dimensional manner. The present invention, however, encompasses even those cases where the three-dimensionally moving mechanism is provided on the sample side, and the moving mechanisms are provided on both the probe side and the sample side to systematically realize the three-dimensional motion. It is further allowable to utilize tunneling ions or field emission ions in addition to tunneling electrons and field emission electrons. The invention can further be applied to the fields of recording or replaying information without departing from the scope of the invention.

Though the aforementioned embodiments have described neither details of means for bringing the probe close to the sample nor details of means for selecting the visual fields, it is, in practice, desired to use the invention in combination with these means.

The present invention makes it possible to carry out three-dimensional structure observation over a wide observation area on the sample surface within very short periods of time as well as to measure the surface of a sample that has a very small electric conductivity. Therefore, measurement can be taken at high speeds and a wide variety of samples can be measured. According to the prior art, for example, an STM image (256 raster lines) over a square region having a side of 2.5 μm is obtained requiring a time for measurement of about 90 minutes which, according to the present invention, can be measured within several minutes. Even for wider regions according to the present invention, the STM image over the whole area can be obtained within nearly the same period of time as above. According to the prior art, on the other hand, the time for obtaining the image increases in proportion to the width of the scanning region. Subsidiary effect stemming from fast scanning of the present invention is that noise such as thermal drift is decreased.

What is claimed is:

1. A surface topographic observation method using a scanning tunnelling microscope, comprising the steps of:

applying a voltage between a probe and a sample to be observed;

positioning a tip of the probe close to the surface of the sample;

detecting a tunnel current flowing across the probe and the sample when a distance between the tip of the probe and the surface of the sample is within a tunnelling effect region;

moving the probe away from the surface of the sample when the detected tunnel current reaches a set point value;

moving the probe in a direction substantially parallel with the surface of the sample for scanning the probe from one measurement point to another measurement point when the distance between the tip of the probe and the surface of the same is outside of the tunnelling effect region; and obtaining information of the surface of the sample from the spatial position of the tip of the probe when the tunnel current reaches the set point value at respective measurement points;

wherein the steps of detecting a tunnel current and moving the probe away from the surface of the sample when the detected tunnel current reaches a set point value includes detecting when the tunnel current reaches the set point value and immediately moving the probe away from the surface of the sample when the detected tunnel current reaches the set point value, the detection of the tunnel current and obtaining of information of the surface of the sample at respective measurement points being effected without servo control of the positioning of the tip of the probe close to the surface of the sample.

2. A surface topographic observation method according to claim 1, wherein the set point value is the value at which tunnel current begins to flow across the probe and the sample.

3. A surface topographic observation method according to claim 1, wherein the step of positioning a tip of the probe close to the surface of the sample includes applying a signal to a piezoelectric member of the probe so as to effect elongation thereof, and the step of moving the probe away from the surface of the sample when the detected tunnel current reaches a set point value includes stopping the application of the signal for elongating the piezoelectric member so that the piezoelectric member immediately contracts upon detection of reaching of the set point value.

4. A surface topographic observation method according to claim 3, wherein the step of applying an elongation signal includes applying a digital signal for providing a stepped elongation of the piezoelectric member in accordance therewith, and the step of obtaining information of the surface of a sample from the spatial position of the tip of the probe when the tunnel current reaches the set point value at respective measurement points includes counting a digital signal indicative of the elongation signal representative of the spatial position of the tip of the probe.

5. A scanning tunnelling microscope comprising:

a probe having a tip facing a surface of a sample to be observed;

means for applying a voltage between a probe and a sample;

means for positioning a tip of the probe close to the surface of the sample so that the distance between the tip of the probe and the surface of the sample is within a tunnelling effect region;

means for measuring a tunnel current flowing across the probe and the sample when the distance is within the tunnelling effect region;

means for moving the probe away from the surface of the sample when the detected tunnel current reaches a set point value;

scanning means for discretely moving the probe in a direction substantially parallel with the surface of the sample from one measurement point to another measurement point when the probe has been moved away from the surface of the sample and the distance is outside of the tunnelling effect region; and means for obtaining information of the surface of the sample from the spatial position of the tip of the probe when the tunnel current reaches the set point value at respective measurement points;

wherein the means for measuring a tunnel current includes means for detecting when the tunnel current reaches the set point value and the means for moving the probe away from the surface of the sample effects immediate movement of the probe away from the surface of the sample after the detected tunnel current reaches the set point value, the means for measuring the tunnel current and the means for obtaining information on the surface of the sample operating without the means for stopping the application of the signal for elongating the piezoelectric member so that the piezoelectric member immediately contracts upon detection of reaching of the set point value.

6. A scanning tunneling microscope according to claim 5, wherein the detecting means detects the value at which tunnel current begins to flow across the probe and the sample as the set point value.

7. A scanning tunneling microscope according to claim 5, wherein the means for positioning a tip of the probe close to the surface of the sample includes means for applying a signal to a piezoelectric member of the probe so as to effect elongation thereof and the means for moving the probe away from the surface of the sample when the detected tunnel current reaches a set point value includes means for stopping the application of the signal for elongating the piezoelectric member so that the piezoelectric member immediately contracts upon detection of reaching of the set point value.

8. A scanning tunnelling microscope according to claim 7, wherein the means for applying an elongation signal includes digital means for applying a digital signal for providing a stepped elongation of the piezoelectric member in accordance therewith, and the means for obtaining information of the surface of a sample from the spatial position of the tip of the probe when the tunnel current reaches the set point value at respective measurement points includes means for counting a digital signal indicative of the elongation signal representative of the spatial position of the tip of the probe.

9. A surface topographic observation method comprising the steps of:

moving a probe so that a tip of the probe approaches a surface of the sample;

measuring a physical quantity when a distance between the tip of the probe and the surface of the sample is within a predetermined region;

detecting a moment when the physical quantity reaches a set point value;

moving the probe away from the surface of the sample immediately upon detection of the moment when the physical quantity reaches the set point value and from one measurement point to another measurement point relative to the surface of the sample so that at least during a part of the movement of the probe the distance between the tip of the probe and the surface of the sample is outside of the predetermined region; and obtaining information of the surface of the sample from spatial positions of the tip of the probe at the moment when the physical quantity reaches the set point value at respective measurement points;

wherein the detection of the physical quantity and obtaining of information of the surface of the sample at respective measurement points is effected without servo control of the moving of the tip of the probe to approach the surface of the sample.

10. A surface topographic observation method according to claim 9, wherein the set point value is the value at which the physical quantity is initially able to be detected.

11. A surface topographic observation method according to claim 9, wherein the step of moving the tip of the probe to approach the surface of the sample includes applying a signal to a piezoelectric member of the probe so as to effect elongation thereof and the step of moving the probe away from the surface of the sample when the detected physical quantity reaches a set point value includes stopping the application of the signal for elongating the piezoelectric member so that the piezoelectric member immediately contracts upon detection of reaching of the set point value.

12. A surface topographic observation method according to claim 11, wherein the step of applying an elongation signal includes applying a digital signal for providing a stepped elongation of the piezoelectric member in accordance therewith, and the step of obtaining information of the surface of a sample from the spatial position of the tip of the probe when the physical quantity reaches the set point value at respective measurement points includes counting a digital signal indicative of the elongation signal representative of the spatial position of the tip of the probe.

13. A surface topographic observation method according to claim 9, wherein the physical quantity is a tunnel current.

14. A surface topographic observation method according to claim 9, wherein the physical quantity is an atomic force.

15. A surface topographic observation method according to claim 9, wherein the physical quantity is a temperature.

16. A surface topographic observation method according to claim 9, wherein the physical quantity is a light.

17. A surface topographic observation method according to claim 9, wherein the physical quantity is an electrostatic capacity.

18. A surface topographic observation method according to claim 9, wherein the physical quantity is an electric resistance.

19. Apparatus for surface topographic observation comprising:

a probe having a tip facing a surface of a sample to be observed;

means for moving the probe so that the tip of the probe approaches the surface of the sample and a distance between the tip of the probe and the surface of the sample comes within a predetermined region;

means for measuring a physical quantity when the distance between the tip of the probe and the surface of the sample is within the predetermined region;

means for detecting a moment when the physical current reaches a set point value;

means for immediately moving the probe away from the surface of the sample upon detection of the physical current reaching the set point value and from one measurement point to another measurement point relative to the surface of the sample so that at least during a part of the movement of the probe the distance between the tip of the probe and the surface of the sample is outside of the predetermined region; and means for obtaining information on the surface of the sample from the spatial positions of the tip of the probe at the moment when the detected physical quantity reaches the set point value at respective measurement points;

wherein the detection of the physical quantity and obtaining of information of the surface of the sample at respective measurement points is effected without servo control of the moving of the tip of the probe to approach the surface of the sample.

20. An apparatus according to claim 19, wherein the detecting means detects the set point value as the value at which the physical quantity is initially able to be detected.

21. An apparatus according to claim 19, wherein the means for moving a tip of the probe to approach the surface of the sample includes means for applying a signal to a piezoelectric member of the probe so as to effect elongation thereof, and the means for moving the probe away from the surface of the sample when the detected physical quantity reaches a set point value includes means for stopping the application of the signal for elongating the piezoelectric member so that the piezoelectric member immediately contracts upon detection of reaching of the set point value.

22. An apparatus according to claim 21, wherein the means for applying an elongation signal includes digital means for applying a digital signal for providing a stepped elongation of the piezoelectric member in accordance therewith, and the means for obtaining information of the surface of a sample from the spatial position of the tip of the probe when the physical quantity reaches the set point value at respective measurement points includes means for counting a digital signal indicative of the elongation signal representative of the spatial position of the tip of the probe.

23. An apparatus according to claim 19, wherein the physical quantity is a tunnel current and the apparatus is a scanning tunnelling microscope.

24. An apparatus according to claim 19, wherein the physical quantity is an atomic force.

25. An apparatus according to claim 19, wherein the physical quantity is a temperature.

26. An apparatus according to claim 19, wherein the physical quantity is a light.

27. An apparatus according to claim 19, wherein the physical quantity is an electrostatic capacity.

28. An apparatus according to claim 19, wherein the physical quantity is an electric resistance.

29. A surface topographic observation method using a scanning tunnelling microscope, comprising the steps of:

applying a voltage between a probe and a sample to be observed;

positioning a tip of the probe close to the surface of the sample;

detecting a tunnel current flowing across the probe and the sample when a distance between the tip of the probe and the surface of the sample is within a tunnelling effect region;

moving the probe away from the surface of the sample when the detected tunnel current reaches a set point value;

moving the probe in a direction substantially parallel with the surface of the sample for scanning the probe from one measurement point to another measurement point when the distance between the tip of the probe and the surface of the sample is outside of the tunnelling effect region; and obtaining information of the surface of the sample from the spatial position of the tip of the probe when the tunnel current reaches the set point value at respective measurement points;

wherein the step of moving the probe away from the surface of the sample when the detected tunnel current reaches the set point value is effected immediately when the detected tunnel current first arrives at the set point value independently of the tunnel current becoming a constant value of the set point value.

30. A scanning tunnelling microscope comprising:

a probe having a tip facing a surface of a sample to be observed;

means for applying a voltage between a probe and a sample;

means for positioning a tip of the probe close to the surface of the sample so that the distance between the tip of the probe and the surface of the sample is within a tunnelling effect region;

means for measuring a tunnel current flowing across the probe and the sample when the distance is within the tunnelling effect region;

means for moving the probe away from the surface of the sample when the detected tunnel current reaches a set point value;

scanning means for discretely moving the probe in a direction substantially parallel with the surface of the sample from one measurement point to another measurement point when the probe has been moved away from the surface of the sample and the distance is outside of the tunnelling effect region; and means for obtaining information of the surface of the sample from the spatial position of the tip of the probe when the tunnel current reaches the set point value at respective measurement points;

wherein the means for moving the probe away from the surface of the sample when the detected tunnel current reaches the set point value immediately effects movement of the probe when the detected tunnel current first arrives at the set point value independently of the tunnel current becoming a constant value of the set point value.

* * * * *